No. 732,886.

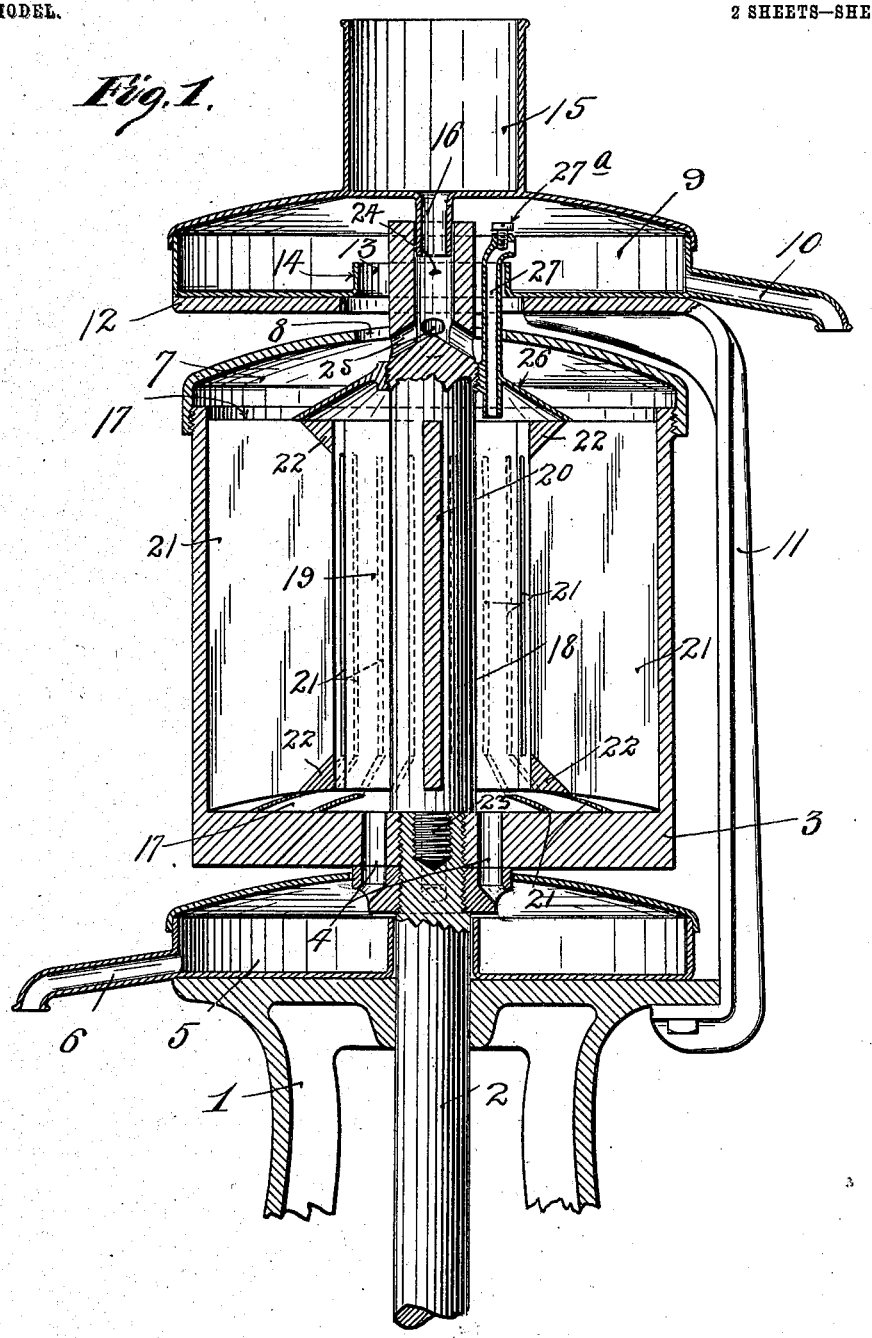

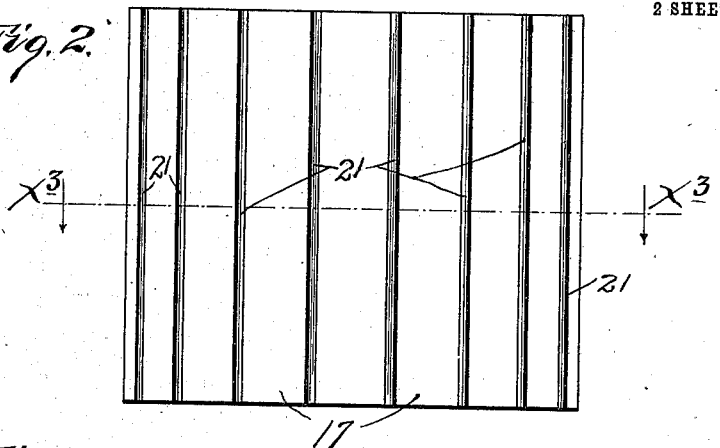
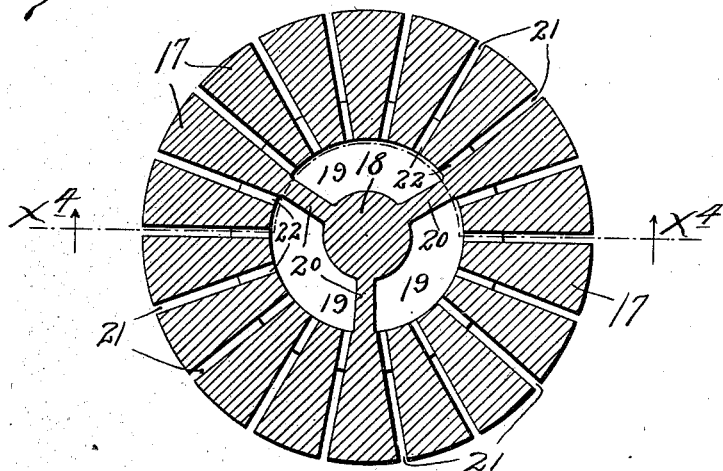
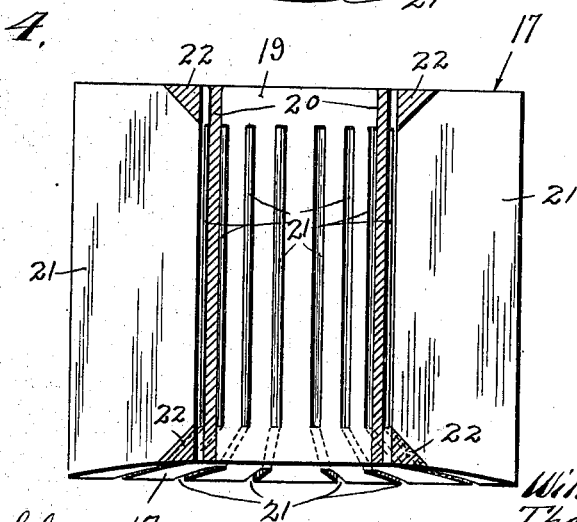

Patented July 7, 1903.

UNITED STATES PATENT OFFICE.

WILLARD A. ODELL AND THOMAS F. EGAN, OF MINNEAPOLIS, MINNESOTA.

CREAM-SEPARATOR.

SPECIFICATION forming part of Letters Patent No. 732,886, dated July 7, 1903.

Application filed November 11, 1901. Serial No. 81,848. (No model.)

*To all whom it may concern:*

Be it known that we, WILLARD A. ODELL and THOMAS F. EGAN, citizens of United States, residing at Minneapolis, in the county of Hennepin and State of Minnesota, have invented certain new and useful Improvements in Cream-Separators; and we do hereby declare the following to be a full, clear, and exact description of the invention, such as will enable others skilled in the art to which it appertains to make and use the same.

Our invention relates to centrifugal cream-separators, and has for its object to improve the same with a view of obtaining increased efficiency both with respect to the quantity of cream which is separated and to the completeness of the separation.

To the above ends the invention consists of the novel devices and combinations of devices hereinafter described, and defined in the claims.

The invention is illustrated in the accompanying drawings, wherein like characters indicate like parts throughout the several views.

Figure 1 is a vertical section taken centrally through a separator embodying our invention, some parts being broken away and others being left in full. Fig. 2 is a detail in side elevation, showing the so-called "liner," which is placed within the separating-bowl and which contains the separating cells or compartments and certain other passages. Fig. 3 is a horizontal section on the line $x^3$ $x^3$ of Fig. 2, and Fig. 4 is a vertical section on the irregular line $x^4$ $x^4$ of Fig. 3.

Of the parts of the machine illustrated the numeral 1 indicates the frame-casting, in which the spindle 2 is mounted in the ordinary or any suitable way with its screw-threaded upper end projecting above said casting for engagement with the hub of the bowl 3. In its bottom, close to its hub portion, the bowl 3 is provided with perforations 4, through which, as will presently be noted, the skim-milk is discharged.

A skim-milk catch-pan 5, having a discharge-spout 6, is secured on the top of the frame-casting 1 in position to receive the skim-milk which is discharged from the perforations 4. The bowl 3 is provided with a cover 7, shown as secured thereto by a screw-threaded engagement and provided at its center with a large perforation 8, for a purpose which will hereinafter appear.

The cream catch-pan 9, which has a discharge-spout 10, is shown as supported from the main frame-casting 1 by a bracket 11, provided at its upper end with a disk-like pan-support 12, having a large perforation 13 at its center. The cream-pan 9 is provided in its bottom with a large central perforation afforded by an upturned flange 14. On its top or cover the pan 9 is provided with the ordinary milk-cup 15, from which depends a discharge-nipple 16.

Within the bowl 3 is a "liner," so-called, 17, which in its exterior contour is cylindrical and closely fits the interior of said bowl. Formed rigid with and preferably cast integral with said block 17 is a core or shaft 18, spaced apart therefrom to form a passage 19, but connected therewith by a plurality, as shown three, of ribs or webs 20. The body of the liner 17 is formed with a plurality of attenuated radial cells or compartments 21, which extend from top to bottom of said liner, so that they are left open both at their tops, bottoms, and inner extremities. The outer extremities of these cells or compartments are closed by the walls of the bowl 3, and to prevent the bottom of the said bowl from closing the lower ends of the cells the bottom of the said liner is formed concave, as best shown in Fig. 1. The portions of the liner 17 intermediate of the cells 21 are connected at their tops and bottoms by triangular sections 22. The lower end of the core or shaft 18 is provided with a screw-threaded stud 23, which is screwed into a suitable seat in the upper end of the spindle 2. The milk-delivery nipple 16 telescopes into an axial perforation or seat 24 in the upper end of the core 18. Below the cover 7 the perforation 24 has a plurality of lateral openings 25. Secured on the core or shaft 18, just below the lateral perforations 25, by means of screw-threads or otherwise is a deflecting-cone 26, which overlaps the upper connecting portions 22 and serves to deliver the milk into the open upper ends of the cells or compartments 21. A cream-delivery tube 27, shown as secured to the conical deflector 26, leads the upper portion of the passage 19 of the liner 17 and opens into the cream-pan 9, above the flange 14 thereof. This cream-tube 27 is provided with an ordinary screw 27ª.

It is very important to note that the so-called "separating cells or compartments" 21 are of the same width or thickness at all points. These cells hold the milk in vertically-extended attenuated columns or sheets of constant thickness while the cream is being separated therefrom by centrifugal force.

The action of the machine described, briefly summarized, is as follows: The milk is supplied to the milk-cup 15 in the ordinary or any suitable way and runs through the nipple 16, perforations 24 25, and over the conical deflector 26 directly into the upper ends of a plurality of separating cells or compartments 21. The skim-milk under the action of centrifugal force is of course thrown outward, while the cream or oily substance is crowded inward. The skim-milk finds an outlet through the bottoms of the several cells and from thence through the discharge-passages 4 in the bottom of the cup 3 into the skim-milk pan 5. The cream, which is forced inward and upward, passes through the cream-tubes 27 and into the cream-pan 9. Independent separations take place in each cell or compartment 21, and hence it follows that the capacity of the machine is dependent on the number of these cells or compartments. These attenuated radial cells break up all cross-currents and make it impossible for eddies to be formed.

It is a well-known fact that milk may be separated with greater efficiency when confined in small bodies or thin sheets than when allowed to collect in greater bulk. Furthermore, when the milk is allowed to collect in considerable bulk within the separating-bowl it remains within the bowl for a comparatively long time, and experience has shown that when the milk is subject to high centrifugal force for a considerable time the heavy solid food products which should be passed off with the skim-milk will be separated from the skim-milk and caused to accumulate against the side of the bowl. With our improved arrangement of the separating cells or compartments the separation is almost instantaneous. The milk is passed through the separator at a very rapid rate of speed, and but a comparatively small amount of milk is contained within the bowl at any one time.

In the preferred form of the device illustrated cream is drawn from the top of the bowl and the skim-milk from the bottom. This is the best and most natural way of effecting the separation; but the separated cream and skim-milk may, however, be both drawn off from the top of the bowl, as in many separators now in use. The so-called "liner," with the radial separating cells or compartments, is preferably constructed of aluminium, and the said cells are usually formed by a milling-tool. The liner may, however, be otherwise constructed as long as it has the plurality of radial and vertically-extended attenuated separating cells or chambers. Furthermore, it is not necessary, so far as the broad idea of our invention is concerned, that the component parts of the filling-liner be integrally formed.

The liner has the further advantage that it is adapted for application to bowls of different form and size. Otherwise stated, our invention is applicable to the bowls of separators now in general use, as all that is required is the removal of the devices usually contained therein and the substitution of our improved device designed of proper form and size to fit the bowl.

Motion may of course be given the spindle 2 either by hand or power and by any suitable drive or speed gear.

What we claim, and desire to secure by Letters Patent of the United States, is as follows:

1. A cream-separator having within its bowl, a liner formed with attenuated radial separating-cells open at their tops and inner extremities, but closed at their outer extremities, substantially as described.

2. A cream-separator having within its bowl a liner formed with attenuated radial separating-cells open at their tops and bottoms and inner extremities but closed at their outer extremities, substantially as described.

3. In a cream-separator, the combination with the bowl, of a liner within said bowl, said liner having an axial passage and a plurality of radial attenuated separating-chambers, closed at their outer extremities by the walls of said bowl, open at their tops and bottoms and communicating at their axial extremities with the axial passage of said filler, substantially as described.

In testimony whereof we affix our signatures in presence of two witnesses.

WILLARD A. ODELL.
THOMAS F. EGAN.

Witnesses:
ELIZABETH KELIHER,
F. D. MERCHANT.